(12) United States Patent
Rieu

(10) Patent No.: US 10,358,300 B2
(45) Date of Patent: Jul. 23, 2019

(54) ARTICLE SORTING EQUIPMENT FOR A LOGISTICS PLATFORM

(71) Applicant: Solystic, Bagneux (FR)

(72) Inventor: Jean Rieu, Sain Georges les Bains (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 15/962,425

(22) Filed: Apr. 25, 2018

(65) Prior Publication Data

US 2018/0319606 A1    Nov. 8, 2018

(30) Foreign Application Priority Data

May 4, 2017   (FR) ...................... 17 53924

(51) Int. Cl.
*B65G 47/38* (2006.01)
*B65G 47/78* (2006.01)
*B65G 17/00* (2006.01)

(52) U.S. Cl.
CPC ........... *B65G 47/78* (2013.01); *B65G 17/005* (2013.01); *B65G 47/38* (2013.01)

(58) Field of Classification Search
CPC .................................................. B65G 47/38
USPC .................................................... 198/370.03
See application file for complete search history.

(56) References Cited

U.S. PATENT DOCUMENTS

| 3,580,379 A | 5/1971 | Shuster et al. |
| 3,791,518 A | 2/1974 | Vanderhoof |
| 9,511,954 B2 * | 12/2016 | Hopman ................... B07C 5/36 |
| 2018/0134422 A1 * | 5/2018 | Kurachi ................. B65B 25/14 |

FOREIGN PATENT DOCUMENTS

| EP | 0 626 324 A1 | 11/1994 |
| FR | 2 881 409 A1 | 8/2006 |

* cited by examiner

*Primary Examiner* — Gene O Crawford
*Assistant Examiner* — Lester Ill Rushin
(74) *Attorney, Agent, or Firm* — Ware, Fressola, Maguire & Barber LLP

(57) ABSTRACT

Article sorting equipment of the invention comprises a flat conveyor of the chain type having carrier links configured to convey articles towards sorting outlets in a certain conveying direction. The links are mounted to slide on the chain transversely relative to the conveying direction and the sorting outlets are disposed under the links of the chain, one after another in the conveying direction. The links are also arranged to come out from under the articles when they are slid so as to cause the articles to fall into the sorting outlets. A monitoring and control unit for monitoring and controlling the sorting equipment is also configured to cause the links to slide as a function of the sorting outlets into which the articles are to be sorted.

8 Claims, 3 Drawing Sheets

ARTICLE SORTING EQUIPMENT FOR A LOGISTICS PLATFORM

CROSS REFERENCE TO RELATED APPLICATION

This application claims priority under 35 USC § 119 to French Patent Application No. 1753924 filed on May 4, 2017, which application is hereby incorporated by reference in its entirety.

TECHNICAL FIELD

The invention relates to the field of article sorting as performed at logistics platforms.

The invention relates more particularly to article sorting equipment comprising a flat conveyor of the chain type having carrier links configured to convey articles towards sorting outlets in a certain conveying direction.

PRIOR ART

Also known as "divider conveyors", flat conveyors of the chain type having carrier links are used in logistics platforms for sorting all types of articles, such as packets, parcels, bottles, etc.

Such conveyors generally comprise a main conveyor with sorting outlets distributed downstream in the conveying direction and a divider making it possible to deflect articles towards appropriate sorting outlets.

Some such conveyors, such as the conveyor described in Document U.S. Pat. No. 3,580,379, are equipped with a chain having slidably mounted links on which the articles are conveyed.

In such a conveyor, the links act as dividers by sliding transversely to the conveying direction so as to guide and direct the packets towards secondary conveyors leading to the appropriate sorting outlets.

Although that type of conveyor is well liked for its reliability in conveying articles, it is however ill-suited for sorting articles at high throughput rates and at high densities.

For increasing numbers of articles to be sorted, it is necessary to have increasing numbers of secondary conveyors and of sorting outlets.

As a result, the links need to slide over greater distances in order to guarantee that articles can be fed to all of the sorting outlets.

The size of the conveyors then becomes too large for use at a logistics platform.

Other conveyors of the chain type having slidably mounted links are described in Documents U.S. Pat. No. 3,791,518 and FR 2 881 409.

SUMMARY OF THE INVENTION

An object of the invention is thus to remedy the above-mentioned problems.

To this end, the invention provides article sorting equipment comprising a flat conveyor of the chain type having carrier slats configured to convey articles towards sorting outlets in a certain conveying direction, said carrier slats being mounted to slide on the chain transversely relative to said conveying direction between a deployed position and a retracted position, wherein the sorting outlets are disposed under the carrier slats of the chain, one after another in said conveying direction when the carrier slats are in the deployed position, and said carrier slats are arranged to come out from under the articles when they are slid into the retracted position so as to cause the articles to fall into the sorting outlets, the sorting equipment further comprising a monitoring and control unit configured to cause the carrier slats to slide as a function of the sorting outlets into which the articles are to be sorted, and in that the conveyor further comprises an abutment of the "comb" type on the chain that is configured to allow the carrier slats to slide and to prevent the transverse movement of the articles on the slats beyond the abutment.

The basic idea of the invention is thus to place the sorting outlets under the links of the chain and to cause the links to slide transversely to the conveying direction, in the manner of a "sliding hatch", so as to create a void over the sorting outlets and cause the articles to fall under gravity.

The idea is also to use a monitoring and control unit for selectively causing one or more links to move.

The advantage of quickly and selectively discharging the articles into the sorting outlets is to make it possible to increase the number of articles to be sorted and the conveying speed.

In addition, by arranging the sorting outlets under the links, the conveyor is made more compact and the secondary conveyors usually used for conveying articles towards the sorting outlets are omitted.

The sorting equipment of the invention may also have the following features:

- for each sorting outlet, the conveyor further comprises a switch system configured to guide the sliding of a plurality of carrier slats disposed over the sorting outlet;
- each switch system causes the carrier slats to slide simultaneously;
- each switch system causes the carrier slats to slide progressively along the conveying direction;
- the sorting equipment further comprises another flat conveyor of the chain type having carrier slats, the two conveyors being disposed symmetrically side-by-side in the conveying direction and being arranged to convey each article on the slats of said two conveyors, and the monitoring and control unit is configured to cause the slats of said other conveyor to slide as a function of the sorting outlets into which the articles are to be sorted so that the mutually facing slats of the two conveyors are slid simultaneously.

BRIEF DESCRIPTION OF THE DRAWINGS

The present invention can be better understood and other advantages appear on reading the following detailed description of an embodiment given by way of non-limiting example and with reference to the accompanying drawings, in which.

DESCRIPTION OF AN EMBODIMENT

The sorting equipment 1 of the invention is adapted to equip logistics sorting platforms or postal sorting centers for sorting articles 2 of the type consisting of packets, postal parcels, etc.

Figure 1:
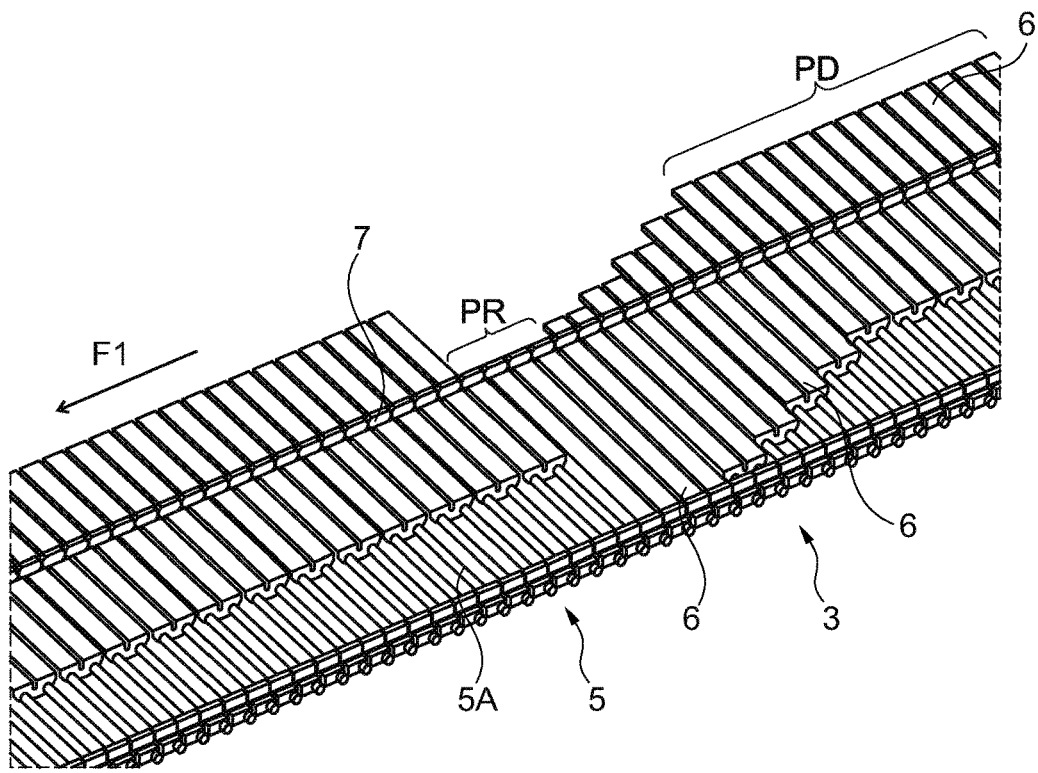
FIG. 1 is a diagrammatic perspective view from above of a flat conveyor of the chain type having slidably mounted links of the invention.
Figure 4:
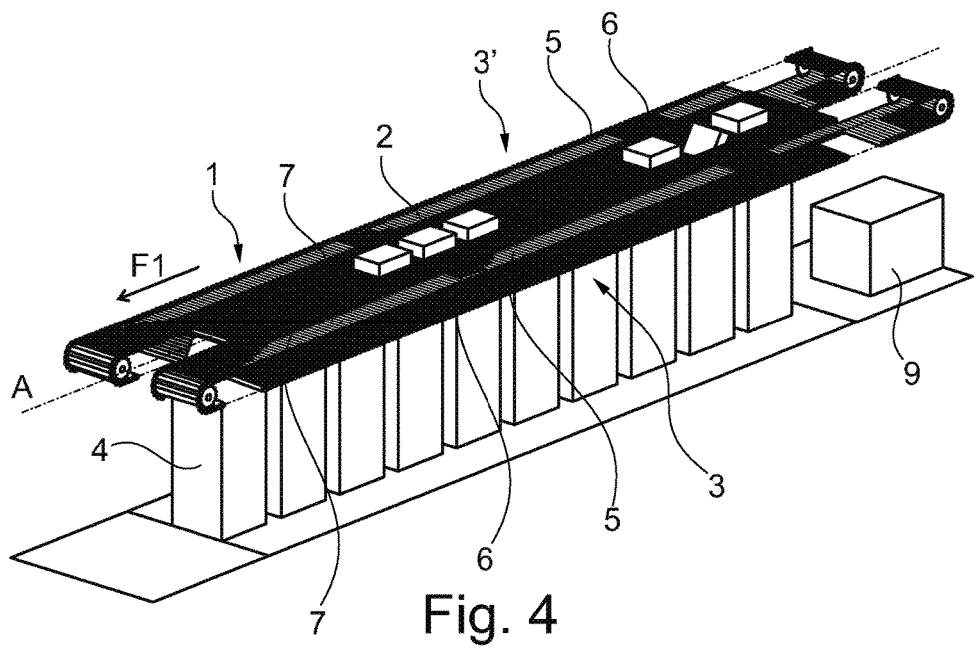
FIG. 4 is a diagrammatic perspective view of the sorting equipment of the invention with two flat conveyors of the chain type having slidably mounted links.
Figure 5:
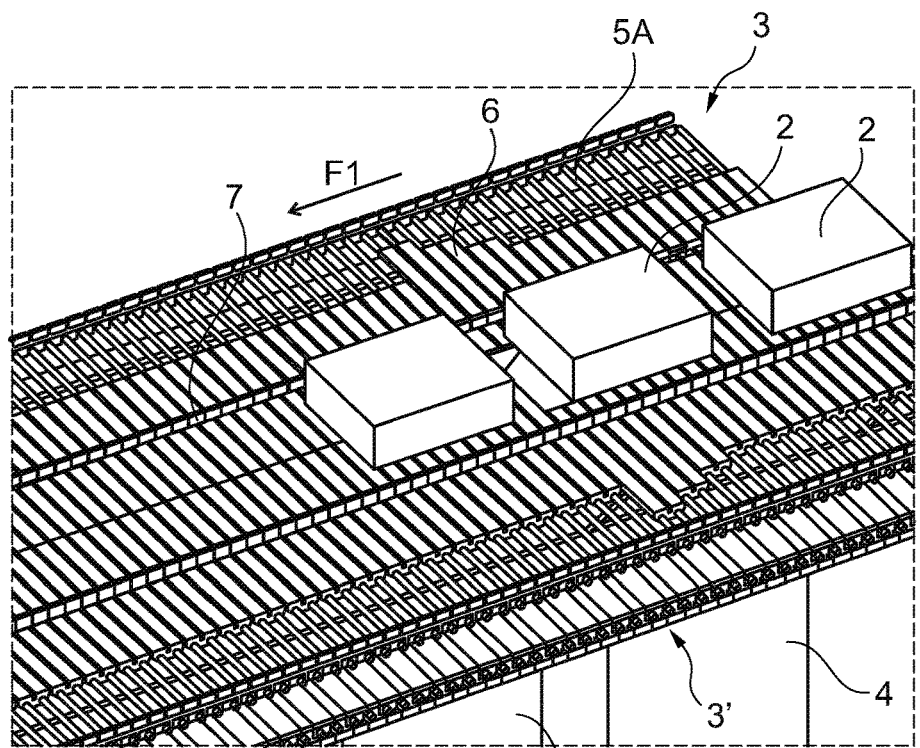
FIGS. 5 and 6 are diagrammatic perspective views showing a portion of the sorting equipment of FIG. 4 at two successive time intervals for discharging an article.
Figure 6:
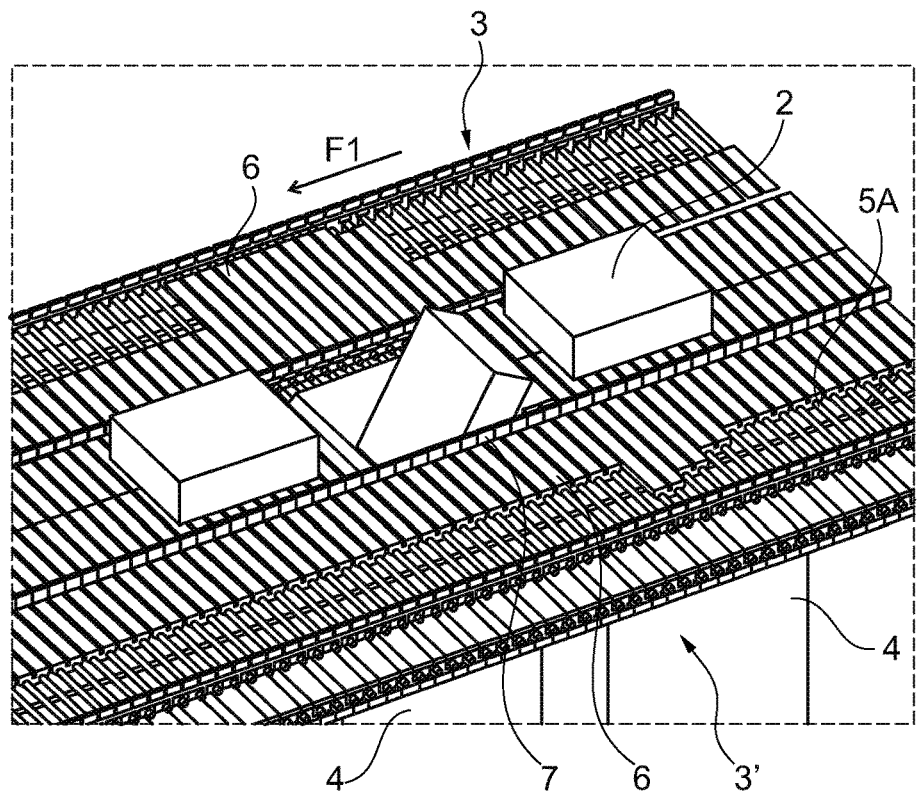

In this example, the sorting equipment 1 of the invention comprises a flat conveyor 3 of the chain type 5 having carrier links 6 as shown in FIG. 1 and that extends in a certain conveying direction indicated by the arrow F1 over a plurality of sorting outlets 4 that can be seen in FIGS. 4 to 6.

The chain 5 comprises a plurality of fixed bars 5A, each of which extends horizontally and transversely to the conveying direction F1.

The links 6 are in the form of carrier slats for carrying articles 2, which slats are mounted to slide on one or more fixed bars 5A transversely to the conveying direction F1.

The conveyor 3 further comprises a plurality of abutments 7 fastened to the ends of the fixed bars 5A on one side of the chain.

In this example, the abutments are configured to allow the links 6 to slide and to prevent the articles 2 from moving beyond the abutment 7 transversely to the conveying direction F1, in the manner of a "comb".

The articles being blocked by the abutments thus accelerates the sliding "hatch" effect of the links.

The links 6 are thus mounted to move between a deployed position PD in which they extend beyond the abutment 7 over the sorting outlets 4 in such a manner as to convey the articles 2 in the conveying direction F1, and a retracted position PR in which the links 6 do not extend beyond the abutment 7 so as to cause the articles 2 to fall into the sorting outlets 4, as shown in FIG. 1.

In this example, the links 6 sliding over the sorting outlets 4 is thus similar to telescopic deployment.

In the deployed position PD, only the links 6 lie over the sorting outlets 4, as shown in FIGS. 4 to 6, so that the openings in the sorting outlets 4 correspond to the amplitude of deployment of the links 6 beyond the abutment 7.

In the retracted position PR, it can be understood that the links 6 are retracted over the fixed bars 5A so as to extend beyond the abutments 7. This position makes it possible to create voids over the sorting outlets 4 so as to cause the articles 2 to fall under gravity.

The abutments 7 extend along the conveyor 3 in the conveying direction F1 in such a manner as to prevent any possibility of the articles 2 crossing them while the links are moving from the deployed position PD to the retracted position PR.

Figure 3:
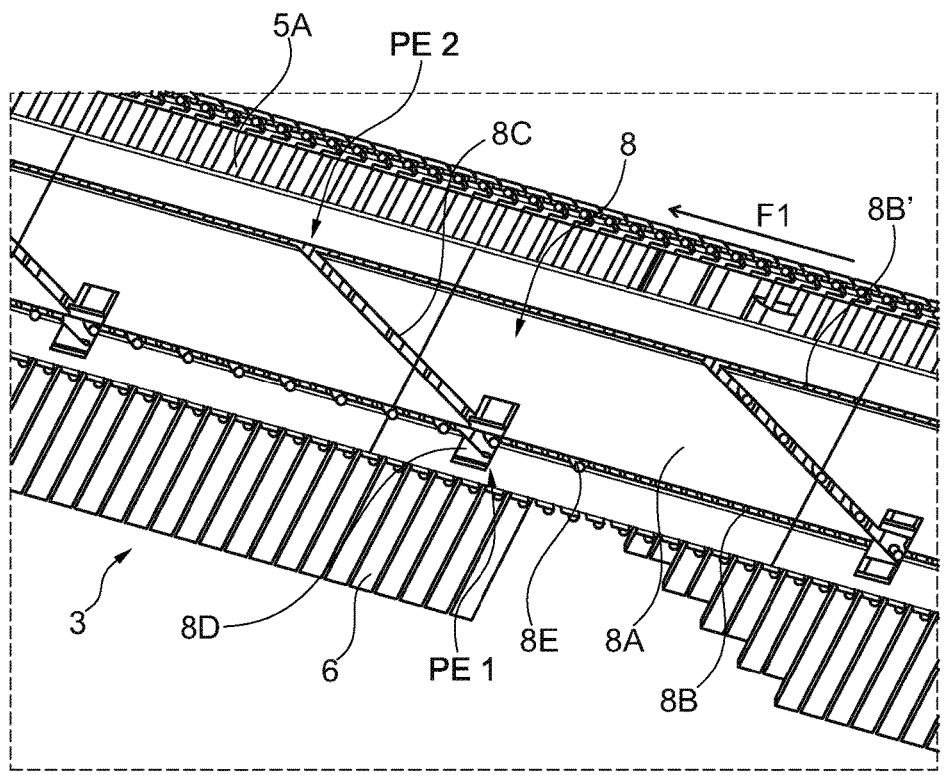
FIG. 3 is a diagrammatic perspective view from below of a flat conveyor of the chain type having slidably mounted links of the invention with its switch system.

The conveyor 3 further comprises a switch system 8, shown in FIG. 3, and configured to guide a plurality of links in sliding over each sorting outlet 4.

The switch system 8 makes it possible to cause the links to slide simultaneously or progressively one after another.

In this example, each switch system 8 comprises a support 8A disposed under the fixed bars 5A and in which two first guide grooves 8B, 8B' extend in the conveying direction F1, and in which a slanting second guide groove 8C extends in the conveying direction F1, which second groove interconnects the first two guide grooves 8B, 8B' at two junction points PE1, PE2, as shown in FIG. 3.

A switcher 8D is also disposed at the junction PE1 that is the furthest upstream relative to the conveying direction F1.

Figure 2:
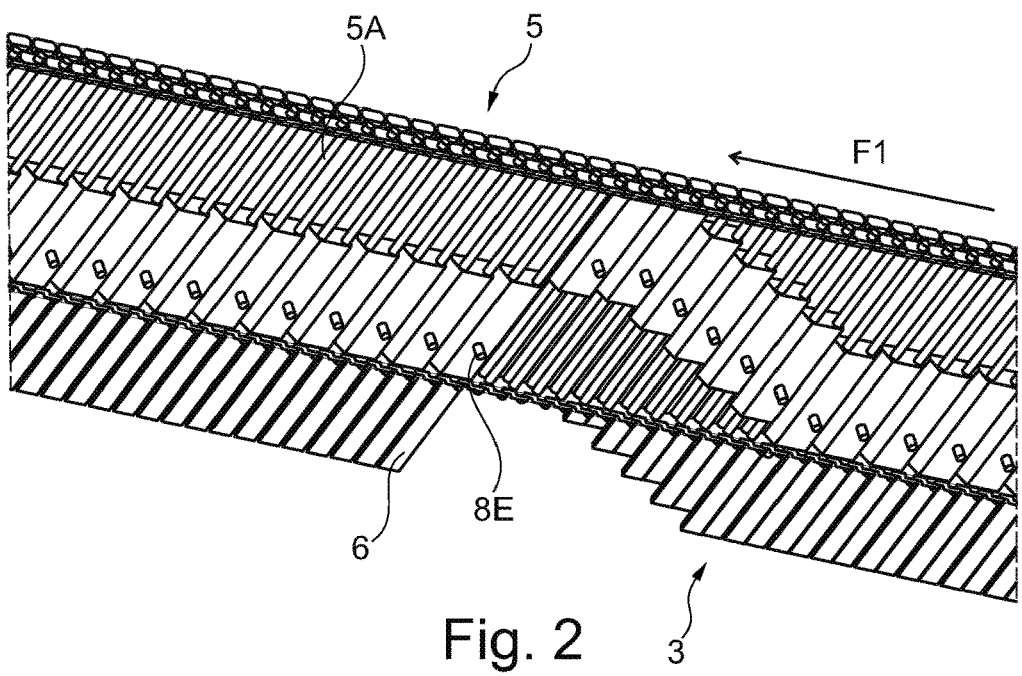
FIG. 2 is a diagrammatic perspective view from below of a flat conveyor of the chain type having slidably mounted links of the invention.

Each slidably mounted link 6 is also provided with lug 8E, as can be seen in FIGS. 2 and 3, on its bottom portion, which lug is configured to move along the first and second guide grooves 8B, 8B'.

Thus, while the links 6 are being moved in the conveying direction F1, the lugs move selectively along the guide grooves 8B, 8B' and 8C as a function of whether the switcher 8D is in the ON position or in the OFF position.

The ON position of the switcher 8D enables the lug 8E to move in the conveying direction F1 in a straight line towards the switching system 8 of the next sorting outlet 4. The links 6 are then maintained in the deployed position so as to convey a carried article 2 towards the next sorting outlet 4 in the conveying direction F1.

The OFF position makes it possible to guide the lug 8E along the slanting guide groove 8C that opens out into the other first guide groove 8B' so as to cause the links 6 to side and so as to cause the article 2 to fall into the appropriate sorting outlet 4.

The sorting equipment 1 further comprises a monitoring and control unit 9 that is shown in FIG. 4 and that is configured to cause the switcher 8E to go into the ON position or into the OFF position.

For that purpose, the monitoring and control unit 9 uses sorting indication data stored in the memory such as the list of sorting outlets 4 into which the articles 2 should be sorted and the size of the articles 2 (width, length, and thickness).

The unit 9 is thus configured to cause one or more links to move selectively so as to cause an article 2 to fall into the appropriate sorting outlet 4.

In a variant embodiment of the invention, the sorting equipment 1 of the invention further comprises another flat conveyor 3' of the chain type having carrier links, which conveyor is identical to the conveyor 3.

The two conveyors 3 and 3' are then disposed symmetrically about the axis A and side-by-side in the conveying direction F1.

The conveyed articles are thus cantilevered out on the links of the two conveyors over sorting outlets 4.

In this example, the monitoring and control unit 9 is thus configured to move the links of the other conveyor 3' as a function of the sorting outlets 4 into which the articles 2 should be sorted.

Thus, in this example, the unit 9 causes the switchers 8E of both of the conveyors 3 and 3' to go into the ON or OFF positions so that the mutually facing links 6 of the two conveyors are slid simultaneously.

In FIGS. 5 and 6, three articles 2 are being conveyed in the conveying direction F1 on the two conveyors 3, 3'.

In FIG. 5, at an instant T, a plurality of links 6 start being slid transversely to the conveying direction F1 in order to anticipate the article 2 situated between the two others falling into the appropriate sorting outlet 4 that is situated further downstream along the conveyors 3, 3'.

In FIG. 6, at an instant T+1, the links 6 have been slid out to the fullest extent so as to cause the article 2 to fall into the appropriate sorting outlet 4. The other articles 2 are conveyed further on the conveyor until the unit 9 decides to discharge them into the appropriate sorting outlets 4.

By means of the two conveyors 3, 3', the amplitude of deployment of the links 6 is small, thereby increasing the speed of discharge of the articles 2 into the sorting outlets 4.

Naturally, the present invention is in no way limited to the above-described embodiment, which can undergo modifications without going beyond the ambit of the invention.

The invention claimed is:

1. An article sorting equipment comprising a flat conveyor of the chain type having carrier slats configured to convey articles towards sorting outlets in a certain conveying direction, said carrier slats being mounted to slide on the chain transversely relative to said conveying direction between a deployed position and a retracted position, said article sorting equipment being characterized in that the sorting outlets are disposed under the carrier slats of the chain, one outlet after another in said conveying direction when the carrier slats are in the deployed position, and said carrier slats are arranged to come out from under the articles when the slats are slid into the retracted position so as to cause the articles to fall into the sorting outlets, the sorting equipment further comprising a monitoring and control unit configured to cause the carrier slats to slide as a function of the sorting outlets into which the articles are to be sorted, and in that the conveyor further comprises an abutment of the "comb" type on the chain that is configured to allow the carrier slats to slide and to prevent the transverse movement of the articles on the slats beyond the abutment.

2. The sorting equipment according to claim 1, wherein for each sorting outlet, the conveyor further comprises a switch system configured to guide the sliding of a plurality of carrier slats disposed over the sorting outlet.

3. The sorting equipment according to claim 2, wherein each switch system causes the carrier slats to slide simultaneously.

4. The sorting equipment according to claim 2, wherein each switch system causes the carrier slats to slide progressively along the conveying direction.

5. The sorting equipment according to claim 4, wherein the sorting equipment further comprises another flat conveyor of the chain type having carrier slats, the two conveyors being disposed symmetrically side-by-side in the conveying direction and being arranged to convey each article on the slats of said two conveyors, and in that the monitoring and control unit is configured to cause the slats of said other conveyor to slide as a function of the sorting outlets into which the articles are to be sorted so that the mutually facing slats of the two conveyors are slid simultaneously.

6. The sorting equipment according to claim 3, wherein the sorting equipment further comprises another flat conveyor of the chain type having carrier slats, the two conveyors being disposed symmetrically side-by-side in the conveying direction and being arranged to convey each article on the slats of said two conveyors, and in that the monitoring and control unit is configured to cause the slats of said other conveyor to slide as a function of the sorting outlets into which the articles are to be sorted so that the mutually facing slats of the two conveyors are slid simultaneously.

7. The sorting equipment according to claim 2, wherein the sorting equipment further comprises another flat conveyor of the chain type having carrier slats, the two conveyors being disposed symmetrically side-by-side in the conveying direction and being arranged to convey each article on the slats of said two conveyors, and in that the monitoring and control unit is configured to cause the slats of said other conveyor to slide as a function of the sorting outlets into which the articles are to be sorted so that the mutually facing slats of the two conveyors are slid simultaneously.

8. The sorting equipment according to claim 1, wherein the sorting equipment further comprises another flat conveyor of the chain type having carrier slats, the two conveyors being disposed symmetrically side-by-side in the conveying direction and being arranged to convey each article on the slats of said two conveyors, and in that the monitoring and control unit is configured to cause the slats of said other conveyor to slide as a function of the sorting outlets into which the articles are to be sorted so that the mutually facing slats of the two conveyors are slid simultaneously.

* * * * *